(12) United States Patent
Zou et al.

(10) Patent No.: US 11,329,319 B2
(45) Date of Patent: May 10, 2022

(54) LITHIUM-ION BATTERY AND ELECTRICAL APPARATUS INCLUDING THE SAME

(71) Applicant: Contemporary Amperex Technology Co., Limited, Ningde (CN)

(72) Inventors: Hailin Zou, Ningde (CN); Ming Zhang, Ningde (CN); Changlong Han, Ningde (CN); Cuiping Zhang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/135,600

(22) Filed: Dec. 28, 2020

(65) Prior Publication Data

US 2021/0119258 A1 Apr. 22, 2021

Related U.S. Application Data

(63) Continuation of application No. PCT/CN2020/090079, filed on May 13, 2020.

(30) Foreign Application Priority Data

Jul. 10, 2019 (CN) .......................... 201910618619.1

(51) Int. Cl.
*H01M 10/056* (2010.01)
*H01M 10/0567* (2010.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC ......... H01M 10/0567; H01M 10/0525; H01M 50/538; H01M 10/0587; H01M 4/525;
(Continued)

(56) References Cited

U.S. PATENT DOCUMENTS

| | | |
|---|---|---|
| 2012/0171564 A1 | 7/2012 | Jagannathan et al. |
| 2019/0237804 A1 | 8/2019 | Shi et al. |
| 2019/0305365 A1* | 10/2019 | Shi ........................ H01M 4/587 |

FOREIGN PATENT DOCUMENTS

| | | |
|---|---|---|
| CN | 102024983 A | 4/2011 |
| CN | 103137931 A | 6/2013 |

(Continued)

OTHER PUBLICATIONS

International Search Report for PCT/CN2020/090079, dated Aug. 17, 2020, 9 pages.

(Continued)

*Primary Examiner* — Cynthia K Walls
(74) *Attorney, Agent, or Firm* — Law Offices of Liaoteng Wang

(57) ABSTRACT

The present disclosure relates to a lithium ion battery including an electrode assembly; and an electrolytic solution for infiltrating the electrode assembly and an electrical apparatus including the same, wherein the electrode assembly includes an electrode body, a positive electrode tab, and a negative electrode tab. The electrode body includes a positive electrode plate, a negative electrode plate, and a separator that are wound together around an axis. The positive electrode plate includes a positive current collector and a positive electrode material layer provided on at least one surface of the positive electrode current collector. In an axial direction (X), the electrode body has two opposite side portions, and the positive electrode tab and the negative electrode tab extend from the two side portions of the electrode body, respectively. A diffusion rate v of the electrolytic solution to the electrode body is from 0.01 μg/s to 5 μg/s.

19 Claims, 3 Drawing Sheets

(51) Int. Cl.
    *H01M 50/538* (2021.01)
    *H01M 4/505* (2010.01)
    *H01M 4/525* (2010.01)
    *H01M 10/0525* (2010.01)
    *H01M 10/0587* (2010.01)
    *H01M 4/02* (2006.01)

(52) U.S. Cl.
    CPC ... *H01M 10/0525* (2013.01); *H01M 10/0587* (2013.01); *H01M 50/538* (2021.01); *H01M 2004/027* (2013.01); *H01M 2004/028* (2013.01)

(58) Field of Classification Search
    CPC .......... H01M 4/505; H01M 2004/027; H01M 2004/028
    See application file for complete search history.

(56) References Cited

FOREIGN PATENT DOCUMENTS

| | | |
|---|---|---|
| CN | 103825047 A | 5/2014 |
| CN | 204243090 U | 4/2015 |
| CN | 106099171 A | 11/2016 |
| CN | 106299449 A | 1/2017 |
| CN | 106602015 A | 4/2017 |
| CN | 106848393 A | 6/2017 |
| CN | 107403918 A | 11/2017 |
| CN | 107851847 A | 3/2018 |
| CN | 108110311 A | 6/2018 |
| CN | 108110318 A | 6/2018 |
| CN | 108963336 A | 12/2018 |
| CN | 109119688 A | 1/2019 |
| CN | 109286020 A | 1/2019 |
| CN | 106133951 B | 7/2019 |
| CN | 110323487 A | 10/2019 |
| JP | 2006221972 A | 8/2006 |
| JP | 2008234988 A | 10/2008 |
| JP | 4190162 B2 | 12/2008 |
| JP | 2010061851 A | 3/2010 |
| JP | 2018504759 A | 2/2018 |
| JP | 2018120711 A | 8/2018 |
| JP | 2020087831 A | 6/2020 |
| WO | WO2014017506 A1 | 1/2014 |
| WO | WO2018094843 A1 | 5/2018 |

OTHER PUBLICATIONS

The Extended European Search Report for European Application No. 20816372.5, dated Aug. 4, 2021, 13 pages.
Zhao Huajun et al: "Film-forming electrolyte additives for rechargeable lithium-ion batteries: progress and outlook", dated Apr. 9, 2019, 23 pages.
The First Office Action for Indian Application No. 202017053767, dated Feb. 3, 2021, 5 pages.
The First Office Action for Chinese Application No. 201910618619.1, dated Mar. 16, 2021, 27 pages.
The First Office Action for Japanese Application No. 2020-564740, dated Nov. 15, 2021, 8 pages.

* cited by examiner

LITHIUM-ION BATTERY AND ELECTRICAL APPARATUS INCLUDING THE SAME

CROSS-REFERENCE TO RELATED APPLICATIONS

The present application a continuation of International Application No. PCT/CN2020/090079, filed on May 13, 2020, which claims priority to Chinese Patent Application No. 201910618619.1, filed on Jul. 10, 2019, both of which are incorporated herein by reference in their entireties.

TECHNICAL FIELD

The present disclosure relates to the field of batteries, and particularly, to a lithium ion battery and an electrical apparatus including the lithium ion battery.

BACKGROUND

Lithium-ion batteries, due to their high operating potential, long battery life and environmental friendliness, have become the most popular energy storage system, and are now widely used in the fields of pure electric vehicles, hybrid electric vehicles, smart grids, and the like. However, the current lithium ion batteries, which are based on the positive electrode material of $LiFePO_4$, cannot meet the higher requirement on endurance. Therefore, it is urgent to develop a lithium ion battery system with higher energy density, in order to eliminate the users' "mileage anxiety" for electric vehicles.

SUMMARY

Inventors have found that the energy density can be increased by using positive electrode materials having high-capacity, such as $LiNi_{0.5}Mn_{1.5}O_4$ having high voltage, and high-nickel ternary NCM811 ($LiNi_{0.8}Co_{0.1}Mn_{0.1}O_2$) and lithium-rich ternary materials. However, these materials have a high lithium content on the surface and thus intensive side reactions may occur between the surface of particles and the electrolytic solution, which may result in a large amount of high-temperature gas production of the lithium-ion batteries that adopt the above positive electrode materials, thereby causing deterioration of cycle and even a safety risk. In addition, for the wound batteries, the existing industrial methods for increasing the energy density is to increase the energy density by improving the space utilization of packaging materials. For example, the battery cell is lengthened in a length direction to reduce the space occupied by tabs configured to leading the current of the positive and negative electrode plates. However, according to the results of the research and development, the improved space utilization will make it more difficult for the electrolytic solution to enter the wound cell. Particularly, during the cycle, a formation and a consumption of a solid electrolyte interphase (SEI) film on the surface of the positive electrode are both dynamic processes, and thus the volumetric expansion-contraction of the cell may extrude the free electrolytic solution to both ends of the wound cell. If the electrolytic solution cannot be reflowed to the middle of the cell in time, it would lead to a lithium precipitation during the cycle of the wound cell due to insufficient kinetics. Meanwhile, since the SEI on the surface of the positive electrode plate is consumed and a new SEI film cannot be formed in time, not only the gas production and cycle life of the cell is deteriorated, but also a serious safety risk may occur. Therefore, it is challenging in the battery design to ensure that lithium ion batteries have both high energy density and high cycle life.

Through a lot of research conducted by the inventors, a first purpose of the present disclosure is to provide a lithium ion battery, in order to solve the problem that the current wound cell cannot have both a high energy density and a good cycle performance.

A second purpose of the present disclosure is to provide an electrical apparatus including the lithium ion battery according to the present disclosure.

In order to achieve the above purposes, the present disclosure adopts the following technical solutions.

A lithium ion battery includes: an electrode assembly; and an electrolytic solution configured to infiltrate the electrode assembly, wherein the electrode assembly includes an electrode body, a positive electrode tab, and a negative electrode tab, and the electrode body includes a positive electrode plate, a negative electrode plate, and a separator disposed between the positive electrode plate and the negative electrode plate, which are together wound around an axis; wherein the positive electrode plate includes a positive current collector and a positive electrode material layer provided on at least one surface of the positive electrode current collector, and the positive electrode plate is connected to the positive electrode tab, and the negative electrode plate is connected to the negative electrode tab; wherein in an axial direction (X), the electrode body has two opposite side portions, and the positive electrode tab and the negative electrode tab extend from the two side portions of the electrode body, respectively; wherein the electrolytic solution includes an additive A, and the additive A contains at least one of a phosphate compound containing unsaturation, a cyclic compound containing $-SO_2-$, or a cyclic siloxane compound containing unsaturation; wherein a diffusion rate v of the electrolytic solution to the electrode body is in a range of 0.01 µg/s to 5 µg/s, preferably 0.2 µg/s to 2 µg/s; wherein the diffusion rate v satisfies: $v=\gamma \times H/L$, where $\gamma$ is an electrolytic solution absorption rate of the positive electrode plate in unit of µg/s; H is a maximum length of the side portion in the width direction (Z) of the electrode body in unit of mm; and L is a length of the electrode body in the axial direction (X) in unit of mm.

An electrical apparatus, includes the lithium ion battery according to the present disclosure.

The technical solutions provided by the present disclosure can bring the following beneficial effects:

The lithium ion battery according to the present disclosure is a wound lithium ion battery, in which the positive and negative electrode tabs are respectively disposed at two side portions of the electrode body along the axial direction, thereby effectively improving the internal space utilization of a single cell and increasing the volumetric energy density of the battery. Meanwhile, adding an additive A capable of forming a dense SEI film on the surface of the positive electrode plate into the electrolytic solution, while matching the wettability of the electrolytic solution with the microstructure of the positive electrode plate and the structure of the electrode body, and controlling the diffusion rate of the electrolytic solution containing the additive A to the electrode body in the range of 0.01 µg/s to 5 µg/s, a new SEI film can be formed on the surface of the positive electrode plate timely and the electrolytic solution can quickly infiltrate and reflow into the interior of the wound cell during cycle, thereby improving the cycle performance and safety of the lithium ion battery and suppressing the gas production of the high high-capacity lithium ion battery. Therefore, the lithium ion battery provided by the present disclosure has the characteristics of high energy density, high cycle stability, and high safety. More preferably, the lithium ion battery also has a high storage performance at high temperature. The electrical apparatus according to the present disclosure includes the above lithium ion battery and thus has at least the same advantages.

DESCRIPTION OF DRAWINGS

In order to clearly illustrate the technical solutions of the embodiments of the present application, the drawings used in the embodiments will be briefly described below. It is obvious that the drawings in the following description are only some examples of the present disclosure. Those skilled in the art can easily obtain other drawings in view of these drawings.

DESCRIPTION OF EMBODIMENTS

In order to make the purpose of the invention, technical solutions and beneficial technical effects of this application clearer, the application will be described in detail below in conjunction with specific embodiments. It should be understood that the embodiments described in this specification are only for explaining the application, not for limiting the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Furthermore, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise stated, the recitation of numerical ranges by "no less than" and "no more than" include all numbers within that range including the endpoints.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Figure 1:
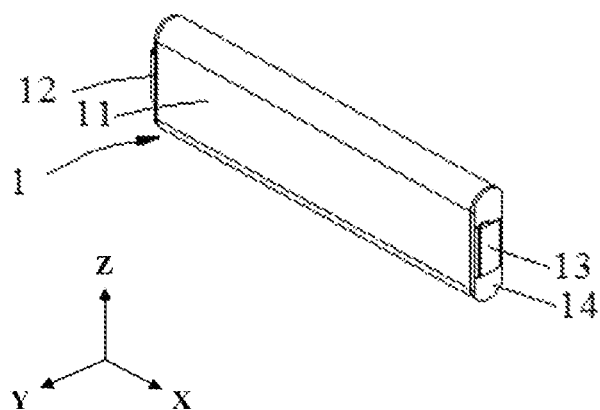
FIG. 1 is a schematic diagram of an electrode assembly according to an embodiment of the present disclosure.
Figure 2:
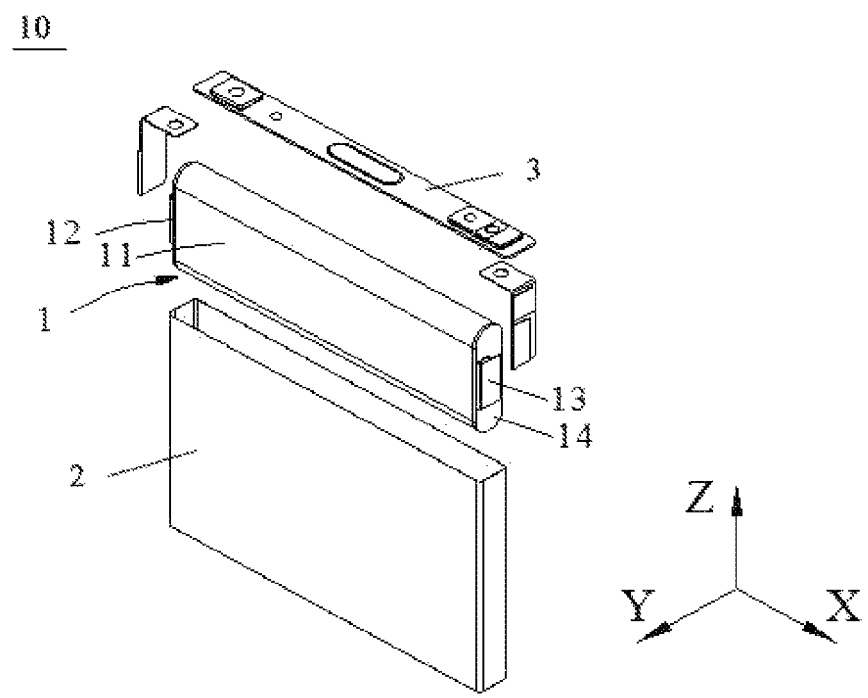
FIG. 2 is an exploded view of a hard-shell lithium ion battery according to an embodiment of the present disclosure.

In a first aspect, the present disclosure provides a lithium ion battery. FIG. 2 illustrates a lithium ion battery 10. Referring to FIG. 2, the lithium ion battery 10 includes an electrode assembly 1 (as shown in FIG. 1), and an electrolytic solution for infiltrating the electrode assembly 1. The electrode assembly 1 includes an electrode body 11, a positive electrode tab 12, and a negative electrode tab 13. The electrode body 11 includes a positive electrode plate, a negative electrode plate, and a separator disposed between the positive electrode plate and the negative electrode plate, which are together wound around an axis. The positive electrode plate includes a positive current collector and a positive electrode material layer provided on at least one surface of the positive electrode current collector. The positive electrode plate is connected to the positive electrode tab 12, and the negative electrode plate is connected to the negative electrode tab 13. In an axial direction (X), the electrode body 11 has two opposite side portions 14. In the lithium ion battery, the positive electrode tab 12 and the negative electrode tab 13 extend from the two side portions 14 of the electrode body 11, respectively. The direction X is the axial direction, around which the positive electrode plate, the negative electrode plate, and the separator provided between the positive electrode plate and the negative electrode plate are wound. The direction X is also a main diffusion direction, along which the electrolytic solution diffuses in the electrode body. A direction Y is a thickness direction of the electrode body 11. A direction Z is a width direction of the electrode body 11.

In the present disclosure, the positive electrode tab 12 and the negative electrode tab 13 are respectively disposed on the both side portions 14 of the electrode body 11. When the positive and negative electrode tabs are further bent towards the thickness direction of the electrode body, the volume occupancy of the electrode body in the battery case is increased, which is conducive to increasing the content of active substance in the internal space of the battery, thereby effectively increasing the volumetric energy density of the lithium ion battery. However, as regards to the cell having a wound structure, the electrolytic solution can only diffuse and enter to the middle of the electrode body from the two side portions of the electrode body. Especially when the electrode tabs are further bent towards the thickness direction (Y) of the electrode body, it is possible that partial diffusion path of the electrolytic solution is blocked, making it more difficult for the electrolytic solution to infiltrate the electrode body. At the same time, during a charging process of the battery, the active material layers on the positive and negative electrode plates may expand in volume, such that the spacing between the electrode plates is reduced and part of the electrolytic solution in the middle of the cell is squeezed out; and during a discharge process of the battery, the active material layers on the positive and negative electrode plates may shrink, the spacing between the electrode plates is increased, such that the free electrolytic solution has to be replenished between the positive and negative electrode plates. If the electrolytic solution fails to be replenished in time, the free lithium ions between the positive and negative electrode plates may cause lithium precipitation due to insufficient electrolytic solution and untimely intercalation during the subsequent cycles. In addition, the SEI film on the surface of the positive electrode plate is completely consumed and cannot forming a new SEI film in time, thereby intensifying the gas production of the battery cell. In this way, the cycle performance of the battery deteriorates and a safety risk may occur.

In the present disclosure, in order to improve the high-temperature suitability and safety of the lithium ion battery according to the present disclosure, the electrolytic solution includes an additive A. The additive A contains at least one of a phosphate compound containing unsaturation, a cyclic compound containing —$SO_2$—, or a cyclic siloxane compound containing unsaturation, and has a diffusion rate v to the electrode body in a range of 0.01 μg/s to 5 μg/s, preferably 0.2 μg/s to 2 μg/s. By introducing the additive A, a passivation layer, which has a dense structure and good stability, is preferentially formed on the surface of the positive electrode, and it can block a direct contact between the positive electrode and the solvent, thereby effectively suppressing the oxidative gas production of the solvent. In the present disclosure, the above film-forming additive is particularly suitable for a high-capacity battery system which has a severe gas generation problem. At the same time, the diffusion rate v of the electrolytic solution to the electrode body is adjusted to 0.01 μg/s to 5 μg/s, preferably 0.2 μg/s to 2 μg/s, such that the electrolytic solution has a good wettability to the electrode body and thus can quickly enter into the electrode body and timely form a new SEI film on the surface of the positive electrode plate. In this way, the cycle performance and safety of the lithium ion battery can be improved, and the gas production during the cycle is alleviated. Furthermore, the lithium ion battery also has a relatively high storage performance at high temperature.

In the present disclosure, the diffusion rate v of the electrolytic solution to the electrode body satisfies: v=γ×H/L, where γ is an electrolytic solution absorption rate of the positive electrode plate, in unit of μg/s; and H is a maximum length of the side portion in the width direction (Z) of the electrode body, in unit of mm; and L is a length of the electrode body in the axial direction (X), in unit of mm. In the present disclosure, the diffusion rate v is calculated by electrolytic solution absorption rate of the positive electrode plate as the main influencing factor, based on the following reasons: the additive A contained in the electrolytic solution mainly acts on the surface of the active material particles of the positive electrode plate to form a dense passivation film, thereby reducing the gas generation of the lithium ion battery; meanwhile, the positive electrode plate generally has a higher compacted density than the negative electrode plate, thus achieving a more compact internal structure, such that the diffusivity of the electrolytic solution to the positive electrode plate has a more significant effect on the cycle performance of the battery.

In the present disclosure, the electrolytic solution absorption rate γ of the positive electrode plate can be measured by the following method: filling the electrolytic solution in a dropper having a certain inner diameter and a standard scale, where the diameter of a lower part of the dropper is 0.2 mm; sufficiently drying the positive electrode plate (for example, drying at 70° C. to 90° C. for 10 h to 15 h), then cutting it into 5 cm×5 cm square positive electrode plate; in a dry room with humidity below 2%, contacting the lower part of the dropper with the square positive electrode plate in such a manner that the dropper is perpendicular to the surface of the square positive electrode plate, gradually infiltrating the square positive electrode plate with the electrolytic solution in the dropper; and recording a mass of the electrolytic solution infiltrating in the square positive electrode plate per second, as the electrolytic solution absorption rate of the positive electrode plate.

In addition, the diffusion rate v of the electrolytic solution to the electrode body is also affected by the structure of the electrode body. In the present disclosure, H is the maximum length of the side portion in the width direction (Z) of the electrode body, in unit of mm; and L is the length of the electrode body in the axial direction (X), in unit of mm. The smaller H can result in a narrower channel through which the electrolytic solution enters the electrode body; and a greater L can result in a longer path along which the electrolytic solution diffuses into the central region of the electrode body. In the present disclosure, when the length L of the electrode body is smaller than the width H, the electrode body has a higher volumetric energy density, but it is not conducive to the rapid entrance of the electrolytic solution into the cell, and the diffusion rate v of the electrolytic solution highly depends on the size of the electrode body, i.e., H and L.

In view of the above, according to the present disclosure, the diffusion rate v of the electrolytic solution to the electrode body is defined as v=γ×H/L(μg/s), where γ is in unit of μg/s, H and L are both in unit of mm.

In some embodiments of the present disclosure, the diffusion rate v of the electrolytic solution to the electrode body can be 0.25 μg/s, 0.37 μg/s, 0.58 μg/s, 0.68 μg/s, 0.75 μg/s, 1.08 μg/s, 1.55 μg/s, 1.97 μg/s, 2.5 μg/s, 3 μg/s, 4 μg/s, or 4.97 μg/s, etc.

In some embodiments of the present disclosure, the electrolytic solution absorption rate γ of the positive electrode plate can be in a range of 0.15 μg/s to 7.25 μg/s, preferably, 0.45 μg/s to 3.58 μg/s. For example, the electrolytic solution absorption rate γ of the positive electrode plate can be 0.71 μg/s, 0.82 μg/s, 0.96 μg/s, 1.08 μg/s, 2.24 μg/s, 2.48 μg/s, 2.57 μg/s, 3.12 μg/s, 4 μg/s, 5 μg/s, 6 μg/s, or 6.51 μg/s etc.

In some embodiments of the present disclosure, the maximum length H of the side portion in the width direction (Z) of the electrode body, and the length L of the electrode body in the axial direction (X) satisfy. 0.05≤H/L≤0.8. In some preferred embodiments of the present disclosure, the ratio H/L is in a range of 0.1 to 0.6. In some further preferred embodiments of the present disclosure, the ratio H/L is in a range of 0.15 to 0.5. In particular, the ratio H/L can be 0.8, 0.75, 0.7, 0.65, 0.6, 0.55, 0.5, 0.45, 0.4, 0.35, 0.3, 0.25, 0.2, 0.1, or 0.05 etc. Compared with the battery having similar length and width, the structure of the electrode body having a smaller H/L ratio can reduce the proportion of the positive and negative electrode tabs in the positive and negative electrode plates to a maximum extent. Thus, the space utilization of the lithium ion battery is relatively increased, and thus the energy density of the lithium ion battery is further increased. At the same time, as the electrode tabs are respectively disposed at the two ends of the electrode body, the circuit design during module assembly can be simplified, thereby improving the assembly efficiency and reducing the cost.

In some embodiments of the present disclosure, the maximum length H of the side portion in the width direction (Z) of the electrode body can be in a range of 10 mm to 280 mm, further 30 mm to 160 mm, more further 45 mm to 150 mm. For example, the maximum length H is 90 mm, 91 mm, 100 mm, 120 mm, 150 mm, or 160 mm etc.

In some embodiments of the present disclosure, the length L of the electrode body in the axial direction (X) can be in a range of 50 mm to 500 mm, further 100 mm to 400 mm, more further 200 mm to 350 mm. For example, the length L is 200 mm, 300 mm, 301 mm, or 350 mm, etc.

In some embodiments of the present disclosure, the axial direction (X) of the electrode body is a horizontal direction. In this case, the winding axis direction of the electrode body is substantially parallel to the horizontal direction, and the electrolytic solution can infiltrate from both ends of the electrode body and diffused into the inside of the electrode main body, which is more advantageous for a rapid infiltration of the electrolytic solution.

In a specific embodiment of the present disclosure shown in FIG. 2, the winding axis direction of the electrode assembly is the horizontal direction, and the electrode assembly is placed in a battery case and sealed with a top cover to assemble a lithium ion battery. According to different application scenarios, the lithium ion battery can be placed vertically (i.e., the direction Z is parallel to the direction of gravity), or can be placed horizontally (i.e., the direction Y is parallel to the direction of gravity).

Figure 3:
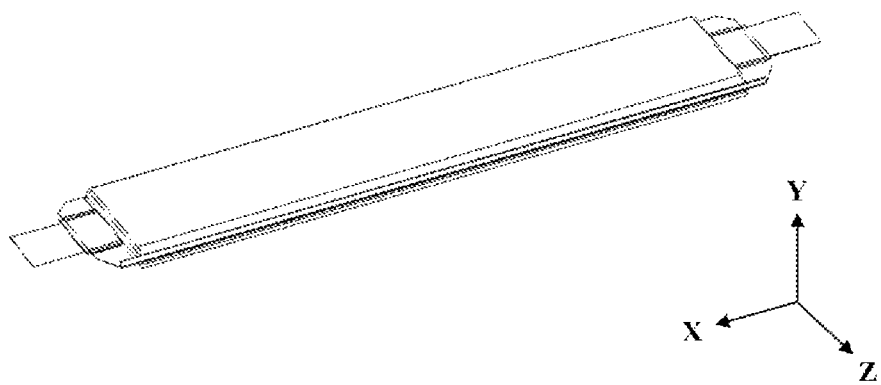
FIG. 3 is a structural schematic diagram of a soft-pack lithium ion battery according to an embodiment of the present disclosure.

In a specific embodiment of the present disclosure, the winding axis direction of the electrode assembly is the horizontal direction, and the electrode assembly is packed by an aluminum plastic film, and the edge of the packaging bag is sealed by hot pressing, glue fixing, or the like, so as to assemble a lithium ion battery, as shown in FIG. 3. According to different application scenarios, the lithium ion battery can be placed vertically (i.e., the direction Z is parallel to the direction of gravity), or can be placed horizontally (i.e., the direction Y is parallel to the direction of gravity).

In some embodiments of the present disclosure, a mass percentage w (%) of the additive A in the electrolytic solution and the diffusion rate v (µg/s) satisfy: $0.01 \leq w \times v \leq 10$, and preferably $0.1 \leq w \times v \leq 10$. For example, w×v can be 0.43, 0.50, 0.65, 0.74, 1.15, 1.35, 1.50, 2.16, 3.11, 3.94, 4.97, 6.74, or 9.84 etc. In some preferable embodiments of the present disclosure, the mass percentage w (%) of the additive A in the electrolytic solution and the diffusion rate v (µg/s) satisfy: $0.4 \leq w \times v \leq 5$.

The inventors have found that, the relationship between the mass percentage w of the additive A in the electrolytic solution and the diffusion rate v of the electrolytic solution to the electrode body can significantly influence the film formation quality and interface impedance of the positive electrode plate, and further affect the gas production and cycle performance of the battery. When the mass percentage w of the additive A in the electrolytic solution and the diffusion rate v satisfy the above relationship, it not only can ensure that the electrolyte solution has a high infiltration or reflow rate, but also can ensure that there is enough additive A to form a stable protective film to suppress the gas production. At the same time, the amount of the additive A is moderate, ensuring the good cycle performance of the lithium ion battery.

In some preferable embodiments, a mass percentage of additive A in the electrolytic solution can be 0.1 wt % 5 wt %, further 0.1 wt % 3 wt %, more further 1 wt % 2 wt %.

In the present disclosure, the phosphate compound containing unsaturation is at least one of compounds represented by Formula (1):

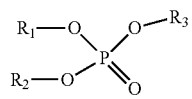

Formula (1)

in which $R_1$, $R_2$, and $R_3$ are each independently selected from the group consisting of C1-C6 alkyl, C2-C6 alkenyl, C2-C6 alkynyl, C1-C6 halogenated alkyl, C2-C6 halogenated alkenyl, C2-C6 halogenated alkynyl, C6-C10 aryl, and C6-C10 halogenated aryl, and at least one of $R_1$, $R_2$, and $R_3$ contains a double bond or a triple bond.

In some embodiments, in Formula 1, $R_1$, $R_2$, and $R_3$ are each independently selected from the group consisting of methyl, ethyl, propyl, isopropyl, butyl, vinyl, allyl, 3-butenyl, isobutenyl, 4-pentenyl, ethynyl, propargyl, 3-butynyl, 1-methyl-2-propynyl, and halogenated derivatives thereof, and at least one of $R_1$, $R_2$, and $R_3$ contains a double bond or a triple bond. Regarding $R_1$, $R_2$, and $R_3$ in Formula 1, the halogenated derivatives include, but are not limited to, monofluoromethyl, difluoromethyl, trifluoromethyl, 2,2,2-trifluoroethyl, 2,2-difluoroethyl, 2,2,2-trifluoroethyl, 3,3-difluoropropyl, 3,3,3-trifluoropropyl and hexafluoroisopropyl. Preferably, $R_1$, $R_2$, and $R_3$ can be independently selected from the group consisting of ethyl, propyl, isopropyl, vinyl, allyl, ethynyl, propargyl and halogenated derivatives thereof; and at least one of $R_1$, $R_2$ and $R_3$ contains a double bond or a triple bond.

Preferably, at least one of $R_1$, $R_2$, and $R_3$ of the phosphate compound containing unsaturation contains an unsaturated C—C bond at a terminal of the branch; and more preferably, at least two of $R_1$, $R_2$, and $R_3$ of the phosphate compound containing unsaturation contains an unsaturated C—C bond at a terminal of the branch.

Further preferably, each of $R_1$, $R_2$, and $R_3$ of the phosphate compound containing unsaturation contains an unsaturated C—C bond at a terminal of the branch.

As some preferred embodiments of the present disclosure, the phosphate compound containing unsaturation represented by Formula (1) is one or more of the following compounds:

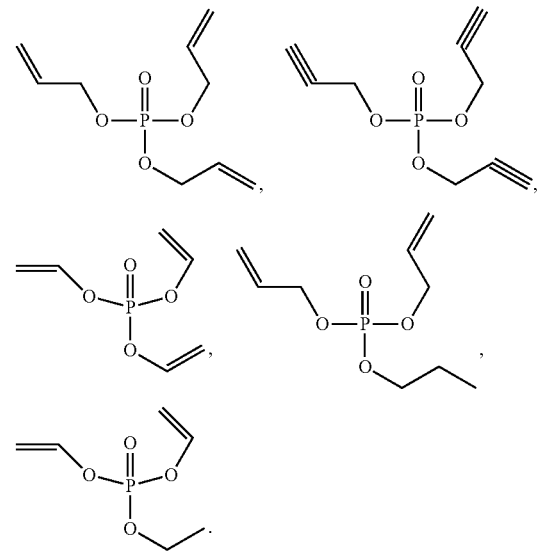

In the present disclosure, the cyclic compound containing —$SO_2$— is at least one of compounds represented by Formula (2) to Formula (4):

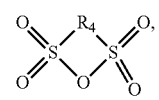

Formula (2)

Formula (3)

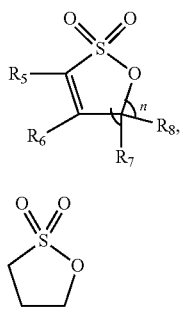

Formula (4)

In the compounds represented by Formula (2), $R_4$ is selected from a group consisting of C1-C4 alkylene, C1-C4 fluorinated alkylene, C2-C4 alkenylene, C2-C4 fluorinated alkenylene, C6-C14 arylene, and C6-C10 fluorinated arylene;

In the compounds represented by Formula (3), $R_5$, $R_6$, $R_7$, and $R_8$ are each independently selected from the group consisting of H, C1-C6 alkyl, C2-C6 alkenyl, C2-C6 alkynyl, C1-C6 halogenated alkyl, C2-C6 halogenated alkenyl, C2-C6 halogenated alkynyl, C6-C10 aryl, and C6-C10 halogenated aryl; and n is 1, 2 or 3.

As some preferred embodiments of the present disclosure, among the compounds represented by Formula (2), the C1-C4 alkylene is a linear or branched alkylene. Specific examples of alkylene include methylene, ethylene, propylene, iso-propylene, butylene, iso-butylene, sec-butylene, 1-methylpropylene, and 2-methylpropylene, and the like.

In Formula (2), for the C1-C4 fluorinated alkylene, the number of fluorine substituent and the position of substitution are not particularly limited, and according to actual requirements, a part or all of hydrogen atoms in the alkylene group can be substituted by fluorine atoms. For example, the number of fluorine atoms can be one, two, three, four or more.

Specific examples of the fluorinated alkylene include 1-fluoromethylene, 1-fluoroethylene, 1,1,2,2-tetrafluoroethylene, 1-fluoropropylene, 2-fluoropropylene, 1,1,1-trifluoropropylene, 1-fluoroisopropylene, 1-fluorobutylene, 1-fluoroisobutylene, 1-fluoro sec-butylene, and the like.

In the above Formula, the C2-C4 alkenylene is a linear or branched alkenylene, preferably the linear alkenylene, and includes one or two double bonds. Specific examples of alkenylene include ethenylidene, allylidene, isopropenylidene, butenylidene, butadienylidene, 1-methylethenylidene, 1-methylpropenylidene, 2-methylpropenylidene, and the like.

In the above Formula (2), for the C2-C4 fluorinated alkenylene, the number of fluorine substituent and the position of substitution are not particularly limited, and according to actual requirements, a part or all of hydrogen atoms in the alkenylene group can be substituted by fluorine atoms. For example, the number of fluorine atoms can be one, two, or more.

Specific examples of the fluorinated alkenylene include-fluoroethenylidene, 1,2-difluoroethenylidene, 1-fluoroallylidene, 1-fluoroisopropenylidene, 1-fluorobutenylidene, 1-fluorobutadienylidene, 1, 2,3,4-tetrafluorobutadienylidene, and the like.

In the above Formula (2), for the C6-C14 arylene, the aryl group is not particularly limited and can be selected according to actual needs, such as phenylene, naphthylene, or alkylphenylene, and the phenyl group can be linked by other substituent groups, such as alkyl.

Specific examples of arylene include phenylene, benzylidene, 1-naphthylene, 2-naphthylene, o-methylphenylene, m-methylphenylene, p-methylphenylene, p-ethylphenylene, m-ethylphenylene, o-ethylphenylene, 1-tetrahydronaphthylene, 2-tetrahydronaphthylene, 4-ethenylphenylene, 3-isopropylphenylene, 4-isopropylphenylene, 4-butylphenylene, 4-isobutylphenylene, 4-tert-butylphenylene, 2,3-dimethylphenylene, 2,4-dimethylphenylene, 2,5-dimethylphenylene, 2,6-dimethylphenylene, 3,4-dimethylphenylene, 3,5-dimethylphenylene, 2, 4, 5-trimethylphenylene, 2,4,6-trimethylphenylene, and the like.

In the above Formula (2), for the C6-C10 fluorinated arylene, the number of fluorine substituent and the position of substitution are not particularly limited. The number of halogen atoms can be one, two, three, four, five or more.

Specific examples of the fluorinated arylene include 2-fluorophenylene, 3-fluorophenylene, 4-fluorophenylene, 2-fluoro-4-methylphenylene, 3-fluoro-4-methylphenylene, 4-fluoro-2-methylphenylene, 2,4-difluorophenylene, 3,4-difluorophenylene, 2,6-difluoro-4-methylphenylene, 2,6-difluoro-3-methylphenylene, 2-fluoronaphthylene, 4-fluoronaphthylene, 2,4,6-trifluorophenylene, 2,3,4,6-tetrafluorophenylene, 4-trifluoromethylphenylene, 2,3,4,5-tetrafluorophenylene, pentafluorophenylene, 3,5-bis(trifluoromethyl)phenylene, and the like.

As some preferred embodiments of the present disclosure, the compounds represented by Formula (2) is one or more of the following compounds:

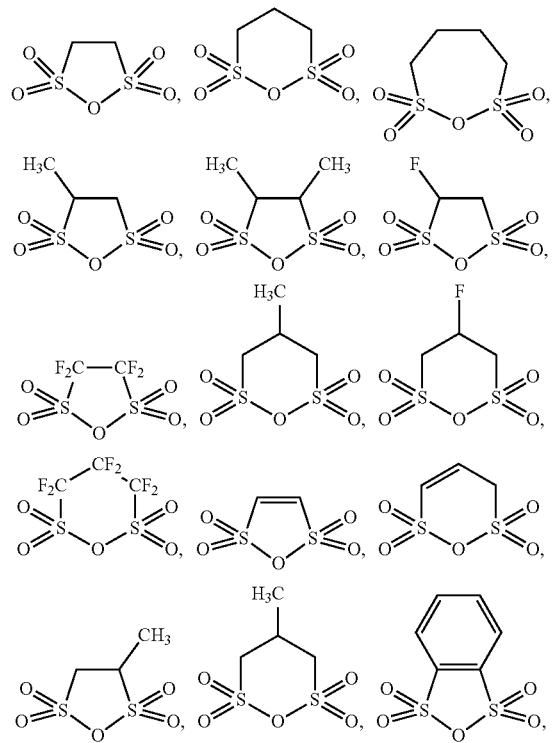

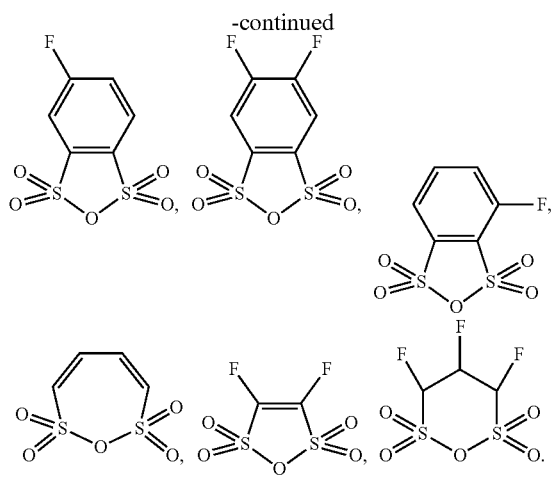

In some embodiments, in the compound of Formula 3, $R_5$, $R_6$, $R_7$ and $R_8$ are independently selected from the group consisting of H, methyl, ethyl, propyl, isopropyl, butyl, vinyl, allyl, 3-butenyl, isobutenyl, 4-pentenyl, ethynyl, propargyl, 3-butynyl, 1-methyl-2-propynyl, and halogenated derivatives thereof. For $R_5$, $R_6$, $R_7$ and $R_8$ in Formula 3, the halogenated derivatives include, but are not limited to, monofluoromethyl, difluoromethyl, trifluoromethyl, 2,2,2-trifluoroethyl, 2,2-difluoroethyl, 2,2,2-trifluoroethyl, 3,3-difluoropropyl, 3,3,3-trifluoropropyl and hexafluoroisopropyl. More preferably, the compound of Formula 3 is one or more of 1,3-propene sultone (PST), 1,4-butene sultone, 1-methyl-1,3-propene sultone, and halogenated derivatives thereof (such as fluorinated derivatives).

In some preferred embodiments, the cyclic compound containing $-SO_2-$ includes the compound represented by Formula 4. The compound represented by Formula 4 is 1,3-propane sultone (PS).

Formula 5

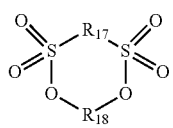

In some embodiments, the cyclic compound containing $-SO_2-$ may also be selected from at least one compound represented by Formula 5.

In Formula 5, $R_{17}$ and $R_{18}$ are each independently selected from the group consisting of C1-C4 alkylene, C1-C4 fluoroalkylene, C2-C4 alkenylene, C2-C4 fluoroalkenylene, C6-C14 arylene, and C6-C10 fluoroarylene. In some embodiments, C1-C4 alkylene, C1-C4 fluoroalkylene, C2-C4 alkenylene, C2-C4 fluoroalkenylene, C6-C14 arylene, and C6-C10 fluoroarylene are the same as described above. In some embodiments, $R_{17}$ and $R_{18}$ are each independently selected from the group consisting of methylene, ethylene, propylene, isopropylidene, vinylidene, allylidene, isopropenylidene, and fluorinated derivatives thereof.

In some preferred embodiments, the compound represented by Formula 5 is methylene methanedisulfonate etc.

In some embodiments, the cyclic compound containing $-SO_2-$ may include at least one of the compounds represented by Formula 2 to Formula 5.

In the present disclosure, the cyclic siloxane compound containing unsaturation is at least one of compounds represented by Formula (6):

Formula (6)

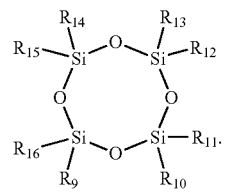

In Formula (6), $R_9$, $R_{10}$, $R_{11}$, $R_{12}$, $R_{13}$, $R_{14}$, $R_{15}$, and $R_{16}$ are each independently a substituted or unsubstituted C1-C4 hydrocarbyl, and at least one of $R_9$, $R_{10}$, $R_{11}$, $R_{12}$, $R_{13}$, $R_{14}$, $R_{15}$, and $R_{16}$ contains a double bond or a triple bond. In some embodiments, $R_9$, $R_{10}$, R, $R_{12}$, $R_{13}$, $R_{14}$, $R_{15}$, and $R_{16}$ are each independently selected from methyl, ethyl, propyl, isopropyl, vinyl, allyl, ethynyl, propargyl, and fluorinated derivatives thereof, and at least one of $R_9$, $R_{10}$, $R_{11}$, $R_{12}$, $R_{13}$, $R_{14}$, $R_{15}$, and $R_{16}$ contains a double bond or a triple bond.

As some preferred embodiments of the present disclosure, the compounds represented by Formula (5) is one or more of the following compounds:

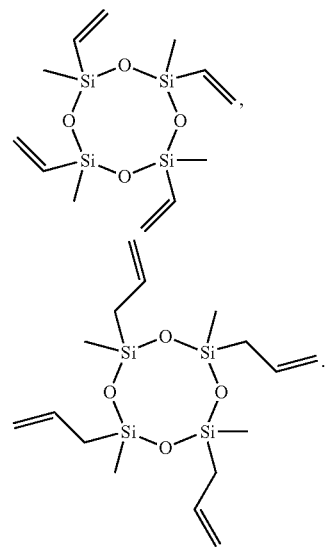

As some preferred embodiments of the present disclosure, the additive A comprises, but not limited to, 1,3-propane sultone, propylene sultone, methylene methanedisulfonate, triallyl phosphate, tetramethyltetravinyl cyclotetrasiloxane, and combinations thereof.

In a further preferred embodiment, the additive A is selected from at least one of methylene methanedisulfonate, triallyl phosphate, and tetramethyltetravinyl cyclotetrasiloxane.

In some embodiments of the present disclosure, the electrolytic solution has a viscosity of 0.5 mPa·s to 5.0 mPa·s at 25±3° C. In the present disclosure, within the above range of the viscosity, the electrolytic solution has a relatively high flow rate, which can effectively enhance the infiltration rate of the electrolytic solution in the positive electrode plate and the diffusion rate of the electrolytic solution in the electrode body. As a preferred embodiment of the present disclosure, the electrolyte solution has a viscosity of 1 mPa·s to 6.0 mPa·s at 0° C. This ensures that the electrolytic solution has good fluidity at both normal and low temperature conditions, so as to guarantee a good kinetic performance of the battery at high and low temperatures.

In some embodiments of the present disclosure, the electrolytic solution includes a low viscous solvent, and optionally include a certain amount of wetting agent. The low viscous solvent has a viscosity smaller than and equal to 0.65 mPa·s at 25±3° C. By using the low viscous solvent, or optionally adding the wetting agent to the electrolytic solution, the electrolytic solution can have a specific flow rate, improving the infiltration rate of the electrolytic solution in the positive electrode plate.

In some embodiments of the present disclosure, the low viscous solvent comprises, but not limited to, at least one of dimethyl carbonate (DMC), methyl formate (MF), ethyl formate (EF), methyl acetate (MA), ethyl acetate (EA), ethyl propionate (EP), ethyl butyrate (EB), tetrahydrofuran (THF), 2-methyltetrahydrofuran, dioxolane (DOL), 1,2-dimethoxyethane (DME), acetonitrile (AN), methyl nonafluorobutyl ether (MFE), and ethyl nonafluorobutyl ether (EFE).

In some embodiments of the present disclosure, in order to obtain the electrolyte solution having a good wettability, a mass percentage of the low viscous solvent in the electrolytic solution is in a range of 10 wt % to 80 wt %, preferably 20 wt % to 60 wt %. The content of the low viscous solvent can be, but not limited to, 10%, 20%, 30%, 40%, 50%, 60%, 70%, or 80%.

In some embodiments of the present disclosure, the electrolytic solution further includes a wetting agent. The wetting agent comprises, but not limited to, at least one of 1,1,2,2 tetrafluoroethyl-2,2,3,3-tetrafluoropropyl ether, 1H,1H,5H-octafluoropentyl-1,1,2,2 tetrafluoroethyl ether, and 1,1,2,2-tetrafluoroethyl-2,2,2-trifluoroethyl ether.

In some embodiments of the present disclosure, a mass percentage of the wetting agent in the electrolytic solution is in a range of 0.1 wt % to 10 wt %. For example, the content of the wetting agent can be 0.1%, 0.5%, 1%, 1.5%, 2%, 3%, 5%, 7%, 9%, or 10%.

In the lithium ion battery according to the present disclosure, the electrolyte solution may further include other solvents, which may be selected from one or more of ethylene carbonate (EC), propylene carbonate (PC), ethyl methyl carbonate (EMC), diethyl carbonate (DEC), dipropyl carbonate (DPC), methylpropyl carbonate (MPC), ethyl propyl carbonate (EPC), butylene carbonate (BC), fluoroethylene carbonate (FEC), propyl acetate (PA), methyl propionate (MP), propyl propionate (PP), methyl butyrate (MB), 1,4-butyrolactone (GBL), sulfolane (SF), methylsulfonyl methane (MSM), ethyl methyl sulfone (EMS) and ethylsulfonyl ethane (ESE).

In the lithium ion battery according to the present disclosure, the electrolyte salt of the electrolytic solution may be selected from one or more of lithium hexafluorophosphate (LiPF$_6$), lithium tetrafluoroborate (LiBF$_4$), lithium perchlorate (LiClO$_4$), lithium hexafluoroarsenate (LiAsF$_6$), Lithium bisfluorosulfonimide (LiFSI), lithium bistrifluoromethanesulfonimide (LiTFSI), lithium trifluoromethanesulfonate (LiTFS), lithium difluorooxalate borate (LiDFOB), lithium dioxalate borate (LiBOB), lithium difluorophosphate (LiPO$_2$F$_2$), lithium difluorodioxalate phosphate (LiDFOP) and lithium tetrafluorooxalate phosphate (LiTFOP).

The positive active material of the positive electrode material layer of the lithium ion battery according to the present disclosure comprises, but not limited to, lithium-cobalt oxide, lithium-nickel oxide, lithium-manganese oxide, lithium-nickel-manganese oxide, lithium-nickel-cobalt-manganese oxide, lithium-nickel-cobalt-aluminum oxide, and olivine-structured lithium-containing phosphate. However, the positive active material is not limited to the above materials, and other materials that are well known as positive active materials of the lithium ion battery also can be used. These positive active materials may be used individually or in any combination thereof.

In some embodiments of the present disclosure, the positive active material includes at least one of compounds represented by General Formula (I) to General Formula (III), $$Li_{1+x}Ni_aCo_bM_{1-a-b}O_{2-y}A_y \quad \text{General Formula (I)}$$

$$Li_{1+x'}Ni_{a'}M'_{2-a'}O_{4-y'}A'_{y'} \quad \text{General Formula (II)}$$

$$c[Li_2MnO_3] \cdot (1-c)[LiM''_2O_{2-y''}A''_{y''}] \quad \text{General Formula (III)}$$

in General Formula (I), $-0.1 \le x \le 0.2$, $0.5 \le a < 1$, $0.02 < b < 0.3$, $0.55 < a+b < 1$, $0 \le y < 0.2$, M is selected from one or more of Mn, Fe, Cr, Ti, Zn, V, Al, Zr, and Ce; A is selected from one or more of S, N, F, Cl, Br, and I;

in General Formula (II), $-0.1 \le x' \le 0.2$, $0.4 \le a' < 0.6$, $0 \le y' < 0.2$, M' is Mn, or comprises Mn and one or more of Fe, Cr, Ti, Zn, V, Al, Zr, Mg, and Ce; A' is selected from one or more of S, N, F, Cl, Br, and I; and in General Formula (III), $0 < c < 1$, $0 \le y' < 0.2$, M" is Ni, Co and Mn; or Ni, Co, Mn and one or more of Fe, Cr, Ti, Zn, V, Al, Zr and Ce; and A" comprises one or more of S, N, F, Cl, Br, and I.

When the positive active material is selected from the compounds represented by the General Formulas (I) to (III), the positive active material has a high Ni content or a high operating voltage during the charge and discharge cycle, and thus the probability of side reactions between the surface of the positive active material particles and the electrolytic solution increases, such that the gas production problem is more likely to occur. When the diffusion rate of the electrolytic solution in the electrode body is in a range of 0.01 μg/s to 5 μg/s, a SEI film having a good film-forming quality can be timely formed on the surface of the above positive electrode material, thereby effectively alleviating the gas production problem of the lithium ion battery using the above positive electrode material.

In some preferred embodiments of the present disclosure, the positive active material can be selected from at least one of LiNi$_{0.8}$Co$_{0.2}$Mn$_{0.3}$O$_2$ (NCM523), LiNi$_{0.55}$Co$_{0.05}$Mn$_{0.4}$O$_2$, LiNi$_{0.55}$Co$_{0.1}$Mn$_{0.35}$O$_2$, LiNi$_{0.55}$Co$_{0.12}$Mn$_{0.33}$O$_2$, LiNi$_{0.55}$Co$_{0.15}$Mn$_{0.3}$O$_2$, LiNi$_{0.6}$Co$_{0.15}$Mn$_{0.25}$O$_2$, LiNi$_{0.6}$Co$_{0.18}$Mn$_{0.22}$O$_2$, LiNi$_{0.6}$Co$_{0.2}$Mn$_{0.2}$O$_2$ (NCM622), LiNi$_{0.65}$Co$_{0.05}$Mn$_{0.3}$O$_2$, LiNi$_{0.65}$Co$_{0.09}$Mn$_{0.26}$O$_2$, LiNi$_{0.65}$Co$_{0.12}$Mn$_{0.23}$O$_2$, LiNi$_{0.65}$Co$_{0.15}$Mn$_{0.2}$O$_2$, LiNi$_{0.8}$Co$_{0.1}$Mn$_{0.1}$O$_2$ (NCM811), LiNi$_{0.85}$Co$_{0.15}$Al$_{0.05}$O$_2$, LiNi$_{0.5}$Mn$_{1.5}$O$_4$, 0.2[Li$_2$MnO$_3$].0.8 [LiNi$_{0.5}$Co$_{0.2}$Mn$_{0.3}$O$_2$], LiNi$_{0.88}$Co$_{0.05}$Mn$_{0.07}$O$_2$, or 0.3 [Li$_2$MnO$_3$].0.7[LiNi$_{0.8}$Co$_{0.1}$Mn$_{0.1}$O$_2$].

In some embodiments of the present disclosure, the positive electrode material layer further includes a conductive agent and a binder, which are not specifically limited and can be selected according to actual needs.

The inventors of the present application have found that, the diffusion rate of the electrolytic solution is also significantly affected by porosity, specific surface area and OI value of the positive electrode material layer.

In some embodiments of the present disclosure, the positive electrode plate includes a positive electrode current collector and a positive electrode material layer coated on a surface of the positive electrode current collector. The positive electrode material layer has a porosity of 10% to 50%, preferably 20% to 40%. With the increasing of the porosity of the positive electrode material layer, the paths through which the electrolytic solution enters the inside of the positive electrode plate are increased and less obstructive, such that the electrolytic solution can infiltrate the positive electrode plate quickly. By limiting the porosity of the positive electrode material layer in the range of 10% to 50%, the electrolytic solution can infiltrate the positive electrode plate in a faster and better manner and the filling amount of the electrolytic solution can be kept within a reasonable range, while the electrode body can have a higher volumetric energy density and mass energy density.

In some embodiments of the present disclosure, the positive electrode material layer has a specific surface area of 0.5 $m^2/g$ to 1.5 $m^2/g$. With the increasing of the specific surface area of the positive electrode material layer, the absorption of the electrolytic solution is facilitated, and the infiltration of the electrolytic solution in the positive electrode plate is accelerated. By limiting the specific surface area of the positive electrode material layer in the range of 0.5 $m^2/g$ to 1.5 $m^2/g$, the electrolytic solution can quickly infiltrate the positive electrode plate, and the contact area between the positive electrode material layer and the electrolytic solution can be controlled within a reasonable range, thereby effectively preventing the occurrence of side reactions between the electrolytic solution and the positive electrode plate. For example, the specific surface area of the positive electrode material layer is 0.53 $m^2/g$, 0.62 $m^2/g$, 0.8 $m^2/g$, 0.92 $m^2/g$, 1 $m^2/g$, or 1.2 $m^2/g$.

In the present disclosure, the positive electrode material layer has a grain orientation OI value of 5 to 120. Preferably, the positive electrode material layer has an OI value of 30 to 70. In the present disclosure, the OI value of the positive electrode material layer is a ratio of a peak area of (003) diffraction peak to a peak area of (110) diffraction peak in an X-ray diffraction pattern of the positive electrode plate. The OI value of the positive electrode material layer can reflect a degree of stacking orientation of the lithium-containing compound particles in the layered structure of the positive electrode material layer, and the respective crystal planes of the positive electrode particles in the positive electrode plate have difference surface energies and different affinities for the electrolytic solution. By adjusting the OI value of the positive electrode material layer to the above range, the wettability of the electrolytic solution in the positive electrode plate can be improved to a certain extent, thereby increasing the diffusion rate of the electrolytic solution in the electrode body. For example, the OI value of the positive electrode film is 32, 37, 40, 50, 62, 75, 80, 90, or 100.

In the present disclosure, the viscosity of the electrolyte has a well-known meaning in the art, and can be tested by a method known in the art. For example, referring to a test standard GB/T 10247-2008, an equipment Brookfield DV2T viscometer is used. An exemplary test method is as follows: first, sealing the electrolytic solution sample, putting it into a constant temperature water bath, and starting the test after reaching the temperature to be tested ±0.1° C., wherein 18 # rotor is used during the test.

The porosity of the positive electrode material layer has a well-known meaning in the art, and can be tested by a method known in the art. For example, referring to a test standard GB/T24586-2009, an equipment AccuPycII1340 is used, and the measuring range is 0.1 $cm^3$~3.5 $cm^3$. The preparation of test sample includes: punching the positive electrode plate into a disc with a diameter of 1.6 cm, wherein the number of the samples is greater than 20 pieces (such as 30 pieces), and recording the number and thickness of the loaded samples in detail.

The specific surface area of the positive electrode material layer has a well-known meaning in the art, and can be tested by methods known in the art. For example, referring to a test standard GB/T 19587-2017, an equipment TriStar II 3020 is used, and the measuring range is ≥0.01 $m^2/g$, and the heating range is 40° C.~350° C.

The OI value of the positive electrode material layer is the ratio of the peak area of (003) diffraction peak to the peak area of (110) diffraction peak in the X-ray diffraction pattern of the positive electrode plate. The X-ray diffraction pattern of the positive electrode plate can be tested using methods known in the art. For example, referring to JIS K 0131-1996, an equipment BruKer D8 Discover is used, and the area of an electrode plate sample is not less than 30 mm*30 mm.

The 2θ angle corresponding to the 003 crystal plane of the layered lithium transition metal oxide is from 17° to 20°; the 2θ angle corresponding to the 110 crystal plane of the layered lithium transition metal oxide is from 63° to 67°.

In the lithium ion battery according to the present disclosure, the negative electrode plate can include a negative electrode current collector and a negative electrode material layer provided on the negative electrode current collector and including the negative active material. The type of the negative active material is not specifically limited and can be selected according to actual needs. For example, the negative active material is a material capable of reversibly deintercalating lithium, including one or more of graphite, silicon, tin, metal oxide, silicon oxide, tin oxide, silicon alloy, tin alloy, silicon carbon composite, tin carbon composite, or lithium titanate, and the like. Preferably, the negative active material is natural graphite, artificial graphite or a mixture thereof. The negative electrode material layer further includes a conductive material and a binder, which are not specifically limited and can be selected according to actual needs. In addition, a metal lithium sheet can be directly used as the negative electrode plate.

In the lithium ion battery according to the present disclosure, the material of the separator is not limited and can be selected according to actual needs.

The present disclosure does not particularly limit a shape of the lithium ion battery, which may be cylindrical, square, or any other shape. As shown in FIG. 2, for example, the lithium ion battery 10 has a square structure.

The lithium ion battery 10 further includes an outer packaging for packaging the electrode assembly 1 and the electrolytic solution (not shown).

In some embodiments, the outer packaging of the lithium ion battery may be a hard shell, such as a hard plastic shell, aluminum shell, steel shell, or the like. The outer packaging of the lithium ion battery may also be a soft packaging, such as in a form of pouch. The soft packaging can be aluminum plastic film packaging or plastic film packaging, which can include one or more of polypropylene (PP), polybutylene terephthalate (PET), and polybutylene succinate (PBS).

In some embodiments, for example, referring to FIG. 2, the outer packaging may include a casing 2 and a cover 3. The casing 2 may include a bottom plate and a side plate connected to the bottom plate, and the bottom plate and the side plate are enclosed to form a receiving cavity. The casing 2 has an opening in communication with the receiving cavity, and the cover plate 3 can cover the opening to close the receiving cavity. The electrode assembly 1 is packaged in the receiving cavity.

One or more electrode assemblies 1 may be included in the lithium ion battery 10, which can be adjusted according to requirements.

In some embodiments, the lithium-ion batteries may be assembled into a battery module, multiple lithium-ion batteries may be contained in the battery module, and the specific number may be adjusted according to the application and capacity of the battery module.

Figure 4:
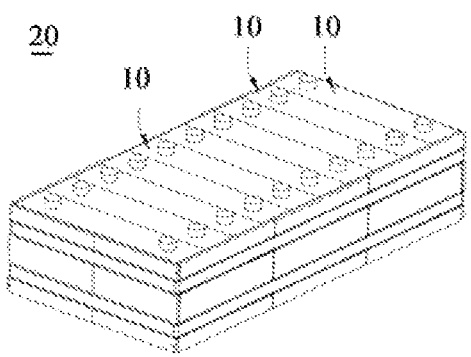
FIG. 4 is a schematic diagram of an embodiment of a battery module.

FIG. 4 illustrates a battery module 20 as an example. Referring to FIG. 4, in the battery module 20, a plurality of lithium ion batteries 10 is arranged in sequence along the length direction of the battery module 20, which can also be arranged in any other manner. Further, the plurality of lithium ion batteries 10 can be fixed by fasteners.

Optionally, the battery module 20 may further include a casing having a receiving space, and the plurality of lithium ion batteries 10 are accommodated in the receiving space.

In some embodiments, the above battery modules can also be assembled into a battery pack, and the number of battery modules contained in the battery pack can be adjusted according to the application and capacity of the battery pack.

Figure 5:
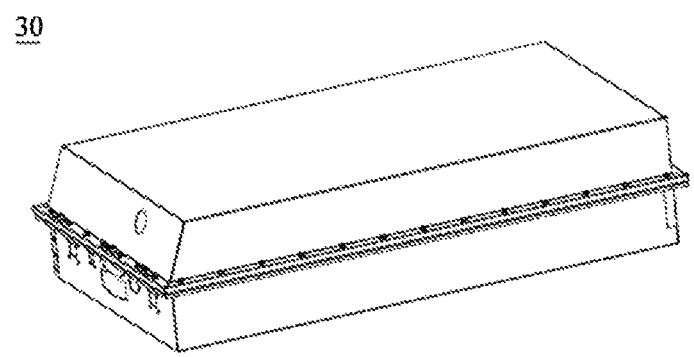
FIG. 5 is a schematic diagram of an embodiment of a battery pack.
Figure 6:
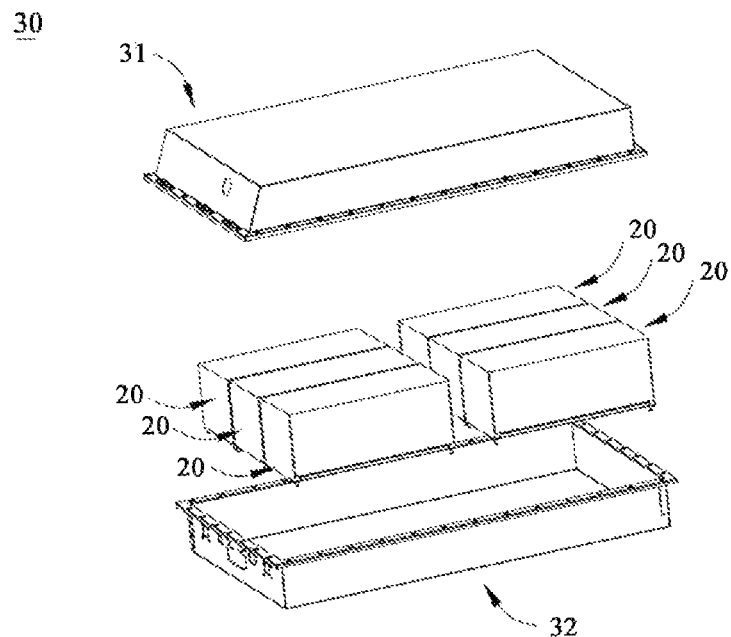
FIG. 6 is an exploded view of FIG. 5.

FIG. 5 and FIG. 6 illustrate a battery pack 30 as examples. Referring to FIG. 5 and FIG. 6, the battery pack 30 may include a battery box and a plurality of battery modules 20 provided in the battery box. The battery box includes an upper body 31 and a lower body 32. The upper body 31 can be placed on the lower body 32 to form an enclosed space for receiving the battery modules 20. The plurality of battery modules 20 may be arranged in the battery box in any manner.

In a second aspect, the present disclosure provides an electrical apparatus including the lithium ion battery according to the present disclosure. The lithium ion battery can be served as a power supply or an energy storage unit of the electrical apparatus.

In the case where the lithium-ion battery according to the present disclosure has high energy density, high cycle performance and high safety, the electrical apparatus including the lithium ion battery according to the present disclosure also has the above-mentioned advantages, which will not be repeated herein.

The electrical apparatus according to the present disclosure can be, for example, a new energy vehicle, an electrical device, an electrical tool, a power storage facility, and the like. Further, the electrical apparatus may be, but not limited to, mobile devices (such as mobile phones, notebook computers, etc.), electric vehicles (such as pure electric vehicles, hybrid electric vehicles, plug-in hybrid electric vehicles, electric bicycles, electric pedal vehicles, electric golf carts, electric trucks, etc.), electric trains, ships and satellites, energy storage systems, etc.

The lithium ion battery, the battery module or the battery pack of the electrical apparatus can be selected according to its applications.

Figure 7:
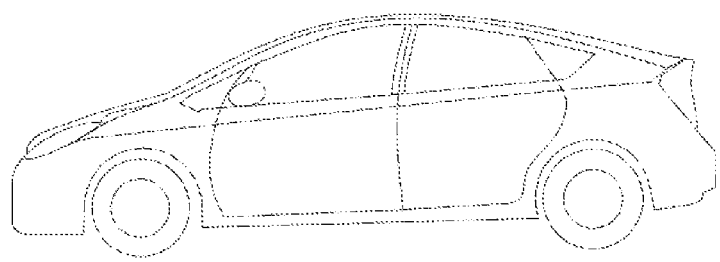
FIG. 7 is a schematic diagram of an embodiment of an electrical apparatus using a lithium ion battery as a power supply.

FIG. 7 illustrates an example of an electrical apparatus. The electrical apparatus is a pure electric vehicle, a hybrid electric vehicle, or a plug-in hybrid electric vehicle. In order to meet the requirements of the apparatus for high power and high energy density of the battery, a battery pack or battery module may be used.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available and used directly without further treatment, and the instruments used in the examples are commercially available.

Example 1

The current example is a lithium ion battery including an electrode body, a positive electrode tab and a negative electrode tab disposed at both ends of the electrode body, and an electrolytic solution for infiltrating the electrode body; wherein the electrode body is formed by sequentially winding a positive electrode plate, a separator, and a negative electrode plate together around an axis, as the structure shown in FIG. 1. The specific preparation process of the lithium ion battery of the present example is as follows:

(1) Preparation of Positive Electrode Plate

A positive active material ($LiNi_{0.8}Co_{0.1}Mn_{0.1}O_2$ (NCM811)), a conductive agent (Super P), and a binder (polyvinylidene fluoride (PVDF)) were mixed in a mass ratio of 94:3:3, added to a solvent of N-methylpyrrolidone (NMP), and stirred evenly in a vacuum mixer to obtain a positive electrode slurry having a solid content of 77 wt %. The positive electrode slurry was uniformly coated on an aluminum foil acting as a positive electrode current collector and having a thickness of 14 μm, dried at 85° C., then subjected to cold pressing, trimming, cutting, and slitting, and finally dried in vacuum at 85° C. for 4 h to obtain a positive electrode plate.

(2) Preparation of Negative Electrode Plate

A negative active material (graphite), a conductive agent (Super P), a thickener (sodium carboxymethylcellulose (CMC-Na)), and a binder (styrene-butadiene rubber emulsion (SBR)) were mixed in a mass ratio of 94:2:2:2, added to a solvent of deionized water, stirred uniformly in a vacuum mixer to obtain a negative electrode slurry having a solid content of 54 wt %. The negative electrode slurry was uniformly coated on a copper foil acting as a negative electrode current collector and having a thickness of 8 μm, dried at 85° C., then subjected to cold pressing, trimming, cutting, and slitting, and finally dried in vacuum at 120° C. for 12 h to obtain a negative electrode plate.

(3) Preparation of Electrolytic Solution

In an argon atmosphere glove box having a water content of <10 ppm, EC, EMC, EA were mixed in a mass ratio of 30:60:10 as an organic solvent, then the sufficiently dried lithium salt $LiPF_6$ was dissolved in the mixed organic solvent, and 2 wt % of triallyl phosphate was added as an additive A to obtain an electrolytic solution after uniformly mixing.

In the electrolytic solution, the concentration of $LiPF_6$ was 1 mol/L.

(4) Preparation of Separator

A polyethylene film (PE) having a thickness of 16 μm was used as a base film. A coating containing ceramic particles was coated on at least one surface of the PE porous film to form a separator.

(5) Preparation of Lithium Ion Battery

The positive electrode plate, the separator and the negative electrode plate were stacked in an order that the separator isolated the positive and negative electrode plates, and then wound to a square electrode body, following by welding electrode tabs on two ends of the electrode body along the length direction. The electrode body was then packed in an aluminum plastic film or steel shell, baked at 80° C. to remove water, filled with the electrolytic solution, and sealed. A finished lithium ion battery was obtained after being subjected to still-standing, hot/cold pressing, formation, pumping, shaping, capacity testing and other processes.

Examples 2-18 and Comparative Examples 1-3

Examples 2-18 and Comparative Examples 1-3 were respectively a lithium ion battery that was substantially same as that of Example 1, except the differences from Example 1 listed in Table 1. In Table 1, the amounts of solvent and additive A were a mass percentage calculated based on the total mass of the electrolytic solution.

Performance Tests

The performances of the lithium ion batteries of the respective examples and comparative examples were tested as follow.

1) Test Method of a Electrolytic Solution Absorption Rate $\gamma$ of the Positive Electrode Plate The positive electrode plates of the respective examples and comparative examples were sufficiently dried, cut into squares of 5 cm×5 cm, and fixed on a sample stage. The capillary having a diameter d of 0.2 mm was then used to absorb the electrolytic solution described in the examples and the comparative examples to a certain height h. The capillary with the electrolytic solution was placed in a vertical contact with the positive electrode plate, and a decline of the liquid level in the capillary was recorded with a stopwatch. Once the decline of the liquid level was finished, the liquid absorption time t was read. The absorption rate value was calculated according to an equation: $\gamma = \pi \times (d/2)^2 \times h \times \rho / t$, where $\rho$ was a density of the electrolytic solution.

The test results of the respective examples and comparative examples are listed in Table 1.

2) Cycle Performance Test of Lithium Ion Batteries at 25° C.

As one charge/discharge cycle, the lithium ion secondary batteries newly obtained in the respective examples and comparative examples stood at 25° C. for 5 min, charged with a constant current of 1 C to 4.2 V, then charged with a constant voltage until the current was equal to or lower than 0.05 C, stood for 5 min, and then the lithium ion secondary batteries were discharged with a constant current of 1 C to 2.8 V. The above obtained discharge capacity was recorded as the discharge capacity of the lithium ion secondary battery in the first cycle. According to the above process, 400-cycle charge/discharge test was performed on each of the lithium ion batteries, and the discharge capacity for each cycle was recorded. The test results of the respective examples and comparative examples were listed in Table 2.

The capacity retention ratio (%) of the lithium ion battery after 400 cycles at 25° C. and 1C/1C=the discharge capacity for the $400^{th}$ cycle/the discharge capacity for the $1^{st}$ cycle× 100%.

(3) Volume Expansion Ratio Test of Lithium Ion Batteries after Storage at High Temperature At 25° C., the lithium ion battery was charged with a constant current of 1 C to a voltage of 4.2 V, then charged with a constant voltage of 4.2V until the current was 0.05 C, and the volume of the lithium ion battery at this time was measured and recorded as $V_2$. Then the full charged lithium ion battery was stored in an incubator at 80° C. for 10 days, and after the storage, the volume of the lithium ion battery was measured using a drainage method and recorded as $V_3$.

The volume expansion ratio (%) of the lithium ion battery after storage at 80° C. for 10 days=$(V_3-V_2)/V_2 \times 100\%$.

The test results of the respective examples and comparative examples were listed in Table 2.

TABLE 1-1

| No. | Positive active material | Porosity of positive electrode plate % | Specific surface area of positive electrode plate $m^2g^{-1}$ | OI value of positive electrode plate | Solvents of electrolytic solution | Mass ratio of solvents | Viscosity of electrolytic solution at 25 ± 3° C. mPa · s |
|---|---|---|---|---|---|---|---|
| Example 1 | NCM811 | 25.60% | 0.62 | 32 | EC + EMC + EA | 30:60:10 | 3.15 |
| Example 2 | NCM811 | 10.20% | 0.53 | 5 | EC + EMC + EA | 30:20:50 | 2.01 |
| Example 3 | NCM811 | 40.10% | 1.2 | 62 | EC + EA | 30:70 | 1.04 |
| Example 4 | NCM811 | 25.60% | 0.62 | 32 | EC + EMC + DMC | 30:20:50 | 2.72 |
| Example 5 | NCM811 | 30.60% | 0.92 | 32 | EC + EMC + EA | 30:40:30 | 2.68 |
| Example 6 | NCM811 | 10.20% | 0.53 | 120 | EC + EMC + DMC | 30:60:10 | 3.25 |
| Example 7 | NCM811 | 40.10% | 1.2 | 62 | EC + EMC + EA | 30:10:60 | 1.35 |
| Example 8 | NCM811 | 25.60% | 0.62 | 32 | EC + EMC + MFE | 30:10:60 | 1.45 |
| Example 9 | NCM811 | 25.60% | 0.62 | 32 | EC + EMC + EFE | 30:10:60 | 1.32 |
| Example 10 | NCM811 | 25.60% | 0.62 | 32 | EC + EMC + MF | 30:10:60 | 1.63 |
| Example 11 | NCM811 | 30.60% | 0.92 | 32 | EC + EMC + EP | 30:10:60 | 1.72 |
| Example 12 | NCM811 | 25.60% | 0.62 | 32 | EC + EMC + EA | 30:10:60 | 1.35 |
| Example 13 | NCM811 | 25.60% | 0.62 | 32 | EC + EFE | 30:70 | 0.93 |
| Example 14 | NCM811 | 30.60% | 0.92 | 32 | EC + DEC + DMC | 30:60:10 | 4.21 |
| Example 15 | NCM811 | 40.10% | 1.2 | 62 | EC + EA | 30:70 | 1.04 |
| Example 16 | NCM811 | 11.20% | 0.27 | 32 | EC + EMC + EA | 30:20:50 | 2.01 |
| Example 17 | 0.2[Li$_2$MnO$_3$]•0.8[LiNi$_{0.5}$Co$_{0.2}$Mn$_{0.3}$O$_2$] | 27.20% | 0.61 | 40 | EC + EMC + DMC | 30:20:50 | 2.72 |
| Example 18 | LiNi0.5Mn1.5O4 | 26.50% | 0.65 | 37 | EC + EMC + DMC | 30:20:50 | 2.72 |
| Comparative Example 1 | NCM811 | 8.60% | 0.45 | 120 | EC + DEC + EMC | 30:20:50 | 3.55 |
| Comparative Example 2 | NCM811 | 50.60% | 1.52 | 4 | EC + EA | 30:70 | 1.04 |
| Comparative Example 3 | NCM811 | 25.60% | 0.62 | 32 | EC + EMC + DMC | 30:20:50 | 2.72 |

TABLE 1-2

| No. | Additive A | Content of additive A wt % | electrolytic solution absorption rate γ of positive electrode plate μg s$^{-1}$ | Length L of cell mm | Height H of cell mm | H/L | calculated diffusion rate v of electrolytic solution in cell μg s$^{-1}$ | w*v |
|---|---|---|---|---|---|---|---|---|
| Example 1 | Triallyl phosphate | 2 | 0.82 | 301 | 91 | 0.30 | 0.25 | 0.50 |
| Example 2 | Triallyl phosphate | 2 | 0.71 | 301 | 91 | 0.30 | 0.21 | 0.43 |
| Example 3 | Triallyl phosphate | 2 | 6.51 | 301 | 91 | 0.30 | 1.97 | 3.94 |
| Example 4 | Triallyl phosphate | 2 | 0.96 | 200 | 120 | 0.60 | 0.58 | 1.15 |
| Example 5 | Triallyl phosphate | 2 | 3.12 | 301 | 150 | 0.50 | 1.55 | 3.11 |
| Example 6 | Triallyl phosphate | 3 | 0.42 | 300 | 10 | 0.03 | 0.01 | 0.04 |
| Example 7 | Triallyl phosphate | 1 | 6.21 | 200 | 160 | 0.80 | 4.97 | 4.97 |
| Example 8 | Triallyl phosphate | 2 | 2.43 | 301 | 30 | 0.10 | 0.24 | 0.48 |
| Example 9 | Triallyl phosphate | 2 | 2.49 | 301 | 45 | 0.15 | 0.37 | 0.74 |
| Example 10 | Methylene methanedisulfonate | 2 | 2.24 | 301 | 91 | 0.30 | 0.68 | 1.35 |
| Example 11 | 1,3-propane sultone | 2 | 2.57 | 301 | 91 | 0.30 | 0.78 | 1.55 |
| Example 12 | Propylene sultone | 2 | 2.48 | 301 | 91 | 0.30 | 0.75 | 1.50 |
| Example 13 | Triallyl phosphate | 2 | 3.58 | 301 | 91 | 0.30 | 1.08 | 2.16 |
| Example 14 | Triallyl phosphate | 2 | 0.43 | 301 | 150 | 0.50 | 0.21 | 0.43 |
| Example 15 | Triallyl phosphate | 5 | 6.51 | 301 | 91 | 0.30 | 1.97 | 9.84 |
| Example 16 | Triallyl phosphate | 0.1 | 0.45 | 301 | 91 | 0.30 | 0.14 | 0.01 |
| Example 17 | Triallyl phosphate | 2 | 1.08 | 301 | 91 | 0.30 | 0.33 | 0.65 |
| Example 18 | Triallyl phosphate | 2 | 1.13 | 301 | 91 | 0.30 | 0.34 | 0.68 |
| Comparative Example 1 | 1,3-propane sultone | 2 | 0.15 | 350 | 20 | 0.06 | 0.009 | 0.02 |
| Comparative Example 2 | 1,3-propane sultone | 1 | 7.25 | 301 | 280 | 0.93 | 6.74 | 6.74 |
| Comparative Example 3 | / | / | 0.96 | 301 | 91 | 0.30 | 0.29 | / |

TABLE 2

| No. | Capacity retention ratio after 400 cycles at 25° C. | Gas production after 400 cycles at 25° C. | Lithium precipitation after 400 cycles at 25° C. | Volume expansion ratio after storage at 80° C. for 10 days | Energy density whkg$^{-1}$ |
|---|---|---|---|---|---|
| Example 1 | 91.82% | 1.13% | no lithium precipitation | 9.61% | 256.2 |
| Example 2 | 91.74% | 1.21% | no lithium precipitation | 9.54% | 256.2 |
| Example 3 | 91.96% | 0.97% | no lithium precipitation | 12.28% | 256.2 |
| Example 4 | 91.69% | 1.21% | no lithium precipitation | 10.25% | 254.6 |
| Example 5 | 90.97% | 1.29% | no lithium precipitation | 9.68% | 255.4 |
| Example 6 | 88.76% | 1.59% | no lithium precipitation | 7.93% | 260.6 |
| Example 7 | 91.81% | 1.02% | no lithium precipitation | 12.56% | 253.1 |
| Example 8 | 90.88% | 1.37% | no lithium precipitation | 12.54% | 258.5 |

TABLE 2-continued

| No. | Capacity retention ratio after 400 cycles at 25° C. | Gas production after 400 cycles at 25° C. | Lithium precipitation after 400 cycles at 25° C. | Volume expansion ratio after storage at 80° C. for 10 days | Energy density whkg$^{-1}$ |
| --- | --- | --- | --- | --- | --- |
| Example 9 | 91.06% | 1.35% | no lithium precipitation | 12.48% | 257.3 |
| Example 10 | 91.27% | 1.26% | no lithium precipitation | 12.55% | 256.2 |
| Example 11 | 88.32% | 1.44% | no lithium precipitation | 13.21% | 256.2 |
| Example 12 | 88.61% | 1.51% | no lithium precipitation | 14.49% | 256.2 |
| Example 13 | 90.21% | 1.08% | no lithium precipitation | 11.26% | 256.2 |
| Example 14 | 89.83% | 1.28% | no lithium precipitation | 12.15% | 255.4 |
| Example 15 | 85.26% | 0.82% | no lithium precipitation | 5.69% | 254.3 |
| Example 16 | 85.69% | 15.69% | no lithium precipitation | 12.56% | 256.2 |
| Example 17 | 86.79% | 2.06% | no lithium precipitation | 15.52% | 257.4 |
| Example 18 | 86.01% | 2.78% | no lithium precipitation | 16.97% | 253.1 |
| Comparative Example 1 | 81.49% | 12.41% | severe lithium precipitation | 10.32% | 261.3 |
| Comparative Example 2 | 84.67% | 12.37% | no lithium precipitation | 32.26% | 252.2 |
| Comparative Example 3 | 82.84% | 21.53% | no lithium precipitation | 33.47% | 256.2 |

In Examples 1 to 18, by using the electrolyte solution containing additive A and defining the diffusion rate of the electrolytic solution in the electrode body in the range of 0.01 μg/s to 5 μg/s, a positive passivation film having high film-forming quality can be formed and can effectively inhibit the side reactions of the electrolytic solution on the surface of the positive active material. Meanwhile, the electrolytic solution had good infiltrating property, which can effectively reduce the difficulty of the electrolytic solution diffusion caused by the high energy density design, such that the additive A can be timely replenished in the interior of the electrode body during the cycle, and the SEI film consumed on the surface of the positive active material can be quickly repaired. In this way, the cell can have high energy density, high cycle capacity retention rate and low volume expansion rate at the same time. In Examples 1 to 5, when the diffusion rate of the electrolytic solution in the electrode body was in a range of 0.2 μg/s to 2 μg/s, the energy density, cycle performance and gas generation of the lithium ion battery can be further optimized.

In Comparative Example 1, the diffusion rate v of the electrolytic solution in the electrode body was significantly smaller than the diffusion rate defined in the present disclosure. It can be seen from the experimental data that a smaller diffusion rate v of the electrolytic solution in the cell cannot achieve the sufficient infiltration rate, which will negatively affect the cycle performance of the lithium ion battery.

In Comparative Example 2, the diffusion rate v of the electrolytic solution in the electrode body was significantly greater than the diffusion rate defined in the present disclosure. It can be seen from the experimental data that a greater diffusion rate v of the electrolytic solution in the cell can lower the cycle performance of the lithium ion battery. The reason was in that, solvents in the electrolytic solution (such as ethylene carbonate EC) and lithium salt may reduce the infiltration rate of the electrolytic solution on the positive electrode plate, but the electrolyte solution required a certain amount of ethylene carbonate EC to dissociate the lithium salt and increase conductivity, and also required a certain amount of lithium salt to provide lithium ions. If the diffusion rate of the electrolytic solution was too high, the dissociation of the lithium salt and conductivity can be negatively affected.

Further, it also can be seen from Examples 1 to 18 that the film-forming quality and the interface impedance of the positive electrode plate are significantly affected by the relationship between the mass percentage of the positive film-forming additive in the electrolytic solution and the diffusion rate v of the electrolytic solution in the electrode body. When a product of the mass percentage w (%) of the additive A in the electrolytic solution and the diffusion rate v (μg/s) was in a range of 0.01 to 10, and particularly in a range of 0.4 to 5, the electrolyte solution had a relatively high infiltration rate and contained sufficient amount of additive A to form a stable protective film for suppressing the gas production, while the amount of additive A was moderate to ensure the good cycle performance of the lithium ion battery.

The preferable embodiments of the present disclosure described above are not intended to limit the claims. Those skilled in the art can make various modifications and changes. Any modifications, equivalent substitutions, improvements made upon the spirit and principles of the present disclosure shall fall within the scope of the present disclosure.

The invention claimed is:

1. A lithium ion battery, comprising:
an electrode assembly; and
an electrolytic solution configured to infiltrate the electrode assembly,
wherein:
the electrode assembly comprises an electrode body, a positive electrode tab, and a negative electrode tab, and the electrode body comprises a positive electrode plate, a negative electrode plate, and a separator disposed between the positive electrode plate and the negative electrode plate, which are wound together around an axis, wherein the positive electrode plate comprises a positive current collector and a positive electrode material layer provided on at least one surface of the positive electrode current collector, and the positive electrode plate is connected to the positive electrode tab, and the negative electrode plate is connected to the negative electrode tab, and in an axial direction (X), the electrode body has two opposite side portions, and the positive electrode tab and the negative electrode tab extend from the two side portions of the electrode body, respectively, and the electrolytic solution comprises an additive A, and the additive A contains at least one of a phosphate compound containing unsaturation, a cyclic compound containing —$SO_2$—, and an cyclic siloxane compound containing unsaturation, and a diffusion rate v of the electrolytic solution in the electrode body is in a range of 0.01 μg/s to 5 μg/s, and the diffusion rate v satisfies: v=γ×H/L, in which γ is an electrolytic solution absorption rate of the positive electrode plate, in unit of μg/s; and H is a maximum length of the side portion in the width direction (Z) of the electrode body, in unit of mm; and L is a length of the electrode body in the axial direction (X), in unit of mm; and the H and L satisfy: 0.05≤H/L≤0.8; and the electrolytic solution absorption rate γ of the positive electrode plate is in a range of 0.15 μg/s to 7.25 μg/s.

2. The lithium ion battery according to claim 1, wherein the diffusion rate v of the electrolytic solution in the electrode body is in a range of 0.2 μg/s to 2 μg/s.

3. The lithium ion battery according to claim 1, wherein the axial direction (X) of the electrode body is horizontal direction.

4. The lithium ion battery according to claim 1, wherein a mass percentage w (%) of the additive A in the electrolytic solution and the diffusion rate v (μg/s) satisfy: 0.1≤w×v≤10.

5. The lithium ion battery according to claim 1, wherein the phosphate compound containing unsaturation is at least one of compounds represented by Formula (1):

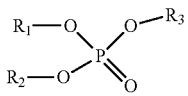

Formula (1)

wherein $R_1$, $R_2$, and $R_3$ are each independently selected from the group consisting of C1-C6 alkyl, C2-C6 alkenyl, C2-C6 alkynyl, C1-C6 halogenated alkyl, C2-C6 halogenated alkenyl, C2-C6 halogenated alkynyl, C6-C10 aryl, and C6-C10 halogenated aryl, and at least one of $R_1$, $R_2$, and $R_3$ contains a double bond or a triple bond.

6. The lithium ion battery according to claim 1, wherein the cyclic compound containing —$SO_2$— is at least one of the compounds represented by Formula (2) to Formula (5):

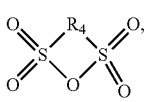

Formula (2)

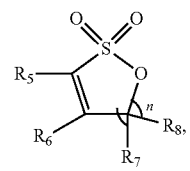

Formula (3)

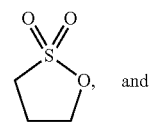

Formula (4)

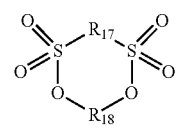

Formula (5)

wherein:

$R_4$ is selected from a group consisting of C1-C4 alkylene, C1-C4 fluorinated alkylene, C2-C4 alkenylene, C2-C4 fluorinated alkenylene, C6-C14 arylene, and C6-C10 fluorinated arylene; and $R_5$, $R_6$, $R_7$, and $R_8$ are each independently selected from the group consisting of H, C1-C6 alkyl, C2-C6 alkenyl, C2-C6 alkynyl, C1-C6 halogenated alkyl, C2-C6 halogenated alkenyl, C2-C6 halogenated alkynyl, C6-C10 aryl, and C6-C10 halogenated aryl; and $R_{17}$ and $R_{18}$ are each independently selected from the group consisting of C1-C4 alkylene, C1-C4 fluoroalkylene, C2-C4 alkenylene, C2-C4 fluoroalkenylene, C6-C14 arylene, and C6-C10 fluoroarylene; and n is 1, 2 or 3.

7. The lithium ion battery according to claim 1, wherein the cyclic siloxane compound containing unsaturation is at least one of compounds represented by Formula (6):

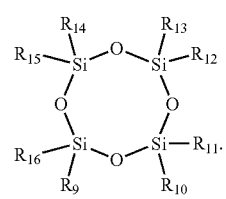

Formula (6)

wherein in formula (6), $R_9$, $R_{10}$, $R_{11}$, $R_{12}$, $R_{13}$, $R_{14}$, $R_{15}$, and $R_{16}$ are each independently selected from the group consisting of a substituted or unsubstituted C1-C4 hydrocarbyl, and at least one of $R_9$, $R_{10}$, $R_{11}$, $R_{12}$, $R_{13}$, $R_{14}$, $R_{15}$, and $R_{16}$ contains a double bond or a triple bond, and the substituent, if present, is halogen.

8. The lithium ion battery according to claim 1, wherein the additive A is selected from at least one of 1,3-propane sultone, propene sultone, methylene methanedisulfonate, triallyl phosphate, and tetramethyltetravinyl cyclotetrasiloxane.

9. The lithium ion battery according to claim 1, wherein the electrolytic solution has a viscosity of 0.5 mPa·s to 5.0 mPa·s at 25±3° C., and/or, the electrolytic solution has a viscosity of 1 mPa·s to 6.0 mPa·s at 0° C.

10. The lithium ion battery according to claim 1, wherein the electrolytic solution comprises a low viscous solvent, and the low viscous solvent has a viscosity of at most 0.65 mPa·s at 25±3° C.

11. The lithium ion battery according to claim 1, wherein the electrolytic solution further comprise a wetting agent, wherein the wetting agent is selected from at least one of 1,1,2,2-tetrafluoroethyl-2,2,3,3-tetrafluoropropyl ether, 1H,1H,5H-octafluoropentyl-1,1,2,2 tetrafluoroethyl ether, and 1,1,2,2-tetrafluoroethyl-2,2,2-trifluoroethyl ether.

12. The lithium ion battery according to claim 1, wherein the positive electrode material layer has a porosity of 10% to 50%.

13. The lithium ion battery according to claim 1, wherein the positive electrode material layer has a specific surface area of 0.5 m²/g to 1.5 m²/g.

14. The lithium ion battery according to claim 1, wherein the positive electrode material layer has a grain orientation OI value of 5 to 120.

15. The lithium ion battery according to claim 1, wherein the positive electrode material layer contains a positive active material, and the positive active material comprises at least one of the compounds represented by General Formula (I) to General Formula (III), $Li_{1+x}Ni_aCo_bM_{1-a-b}O_{2-y}A_y$  General Formula (I)

$Li_{1+x'}Ni_{a'}M'_{2-a'}O_{4-y'}A'_{y'}$  General Formula (II)

$c[Li_2MnO_3]\cdot(1-c)[LiM''_2O_{2-y''}A''_{y''}]$  General Formula (III)

wherein General Formula (I), $-0.1 \leq x \leq 0.2$, $0.5 \leq a < 1$, $0.02 < b < 0.3$, $0.55 < a+b < 1$, $0 \leq y < 0.2$, M is selected from one or more of Mn, Fe, Cr, Ti, Zn, V, Al, Zr, and Ce; A comprises one or more of S, N, F, Cl, Br and I;

in General Formula (II), $-0.1 \leq x' \leq 0.2$, $0.4 \leq a' < 0.6$, $0 \leq y' < 0.2$, M' is Mn, or comprises Mn and one or more of Fe, Cr, Ti, Zn, V, Al, Zr, Mg, and Ce; A' comprises one or more of S, N, F, Cl, Br, and I;

in General Formula (III), $0 < c < 1$, $0 \leq y' < 0.2$, M'' is Ni, Co and Mn; or Ni, Co, Mn and one or more of Fe, Cr, Ti, Zn, V, Al, Zr and Ce, and A'' comprises one or more of S, N, F, Cl, Br, and I.

16. An electrical apparatus, comprising the lithium ion battery according to claim 1.

17. The lithium ion battery according to claim 5, wherein at least one of $R_1$, $R_2$, and $R_3$ of the phosphate compound containing unsaturation contains an unsaturated C—C bond at a terminal.

18. The lithium ion battery according to claim 5, wherein each of $R_1$, $R_2$, and $R_3$ of the phosphate compound containing unsaturation contains an unsaturated C—C bond at all the terminals.

19. The lithium ion battery according to claim 1, wherein the additive A is selected from at least one of methylene methanedisulfonate, triallyl phosphate, and tetramethyltetravinyl cyclotetrasiloxane.

* * * * *